(12) United States Patent
Chen

(10) Patent No.: US 11,983,882 B2
(45) Date of Patent: May 14, 2024

(54) E13B IMAGE INTERPRETATION METHOD

(71) Applicant: Chung-Hsing Chen, Taipei (TW)

(72) Inventor: Chung-Hsing Chen, Taipei (TW)

(73) Assignee: ADVANCED VIEW INC., Taipei (TW)

( * ) Notice: Subject to any disclaimer, the term of this patent is extended or adjusted under 35 U.S.C. 154(b) by 324 days.

(21) Appl. No.: 17/673,575

(22) Filed: Feb. 16, 2022

(65) Prior Publication Data

US 2022/0301174 A1    Sep. 22, 2022

(30) Foreign Application Priority Data

Mar. 16, 2021    (TW) .................. 110109265

(51) Int. Cl.
*G06K 9/00* (2022.01)
*G06T 7/11* (2017.01)
*G06V 30/10* (2022.01)

(52) U.S. Cl.
CPC ................. *G06T 7/11* (2017.01); *G06V 30/10* (2022.01); *G06T 2207/30176* (2013.01)

(58) Field of Classification Search
CPC .................................................. G06V 30/2253
See application file for complete search history.

(56) References Cited

U.S. PATENT DOCUMENTS

| 2005/0281449 A1* | 12/2005 | Takiguchi | G06F 18/256 382/139 |
| 2006/0088199 A1* | 4/2006 | Shizuka | G06V 10/98 382/137 |
| 2010/0092066 A1* | 4/2010 | Shizuka | G06Q 20/042 382/140 |
| 2010/0238205 A1* | 9/2010 | Thomson | B41J 3/01 347/5 |
| 2013/0336569 A1* | 12/2013 | Kinoshita | G06F 18/24133 382/139 |

* cited by examiner

*Primary Examiner* — Hadi Akhavannik
(74) *Attorney, Agent, or Firm* — Che-Yang Chen; Law Office of Michael Chen

(57) ABSTRACT

The invention provides an E13B image interpretation method mainly aiming at interpreting numbers and symbols in a check reading code printed with magnetic ink on a check, and defining a plurality of feature areas for each of the numbers and dividing each of the numbers into a plurality of blocks, and then interpreting according to whether an amount of magnetic ink being in the feature areas and a magnetic ink density between the blocks, and also generating a plurality of target pixels for each of the symbols, and then interpreting according to a relative position and a size of the target pixels.

9 Claims, 7 Drawing Sheets generating a first target pixel, a second target pixel and a third target pixel for a first individual, a second individual and a third individual respectively, and interpreting a length, a width and a position of the first target pixel, the second target pixel and the third target pixel respectively — S81 if the lengths of the first target pixel and the second target pixel being greater than the length of the third target pixel, and the width of the third target pixel being greater than the widths of the first target pixel and the second target pixel, then interpreting as the first symbol — S82 if the length of the first target pixel being greater than the lengths of the second target pixel and the third target pixel, and the vertical axis position of the first target pixel being greater than the vertical axis position of the second target pixel or the vertical axis position of the first target pixel being greater than the vertical axis position of the third target pixel, then interpreting as the second symbol — S83 if the vertical axis position of the third target pixel being smaller than the vertical axis position of the second target pixel, and the vertical axis position of the second target pixel being smaller than the vertical axis position of the first target pixel, then interpreting as the third symbol — S84 if the lengths and the widths of the first target pixel and the second target pixel being greater than the length and the width of the third target pixel, then interpreting as a fourth symbol — S85

FIG. 7

E13B IMAGE INTERPRETATION METHOD

BACKGROUND OF THE INVENTION

Field of Invention

The invention relates to an interpretation method, more particularly to an E13B image interpretation method capable of reducing the cost of interpreting equipment and eliminating the time-consuming process of manual interpretation.

Related Art

At present, in the way of money circulation on the market, check transactions are quite common, and the electromagnetically recognizable E13B font is used for the printing of exchange information of checks, so MICR magnetic ink characters recognition is widely used in the banking industry, which is mainly used in the processing of checks. Banks use special purpose magnetic ink card readers to interpret characters, however, magnetic ink card readers are not only for special purpose, but also expensive. For general accounting departments, or bookkeepers, usually do not buy this equipment, most of them record account data manually. In addition to the relevant checks collected by banks, for a company specializing in buying and selling parts or providing corporate services, it may need to process three to four hundred checks a day, and it must also need a staff specially for keeping the accounts. It is obvious that, except for high-cost equipment or keeping accounts manually, there is no other automatic interpretation equipment for check fonts recognition on the market.

Therefore, the inventor of the invention and relevant manufacturers engaged in this industry are eager to research and make improvement to solve the above-mentioned problems and drawbacks in the prior art.

SUMMARY OF THE INVENTION

Therefore, in order to effectively solve the above problems, a main object of the invention is to provide an E13B image interpretation method capable of reducing the cost of interpreting equipment and eliminating the time-consuming process of manual interpretation.

In order to achieve the above object, the invention provides an E13B image interpretation method comprising following steps of: loading a check, performing a foreground process on the check and obtaining a check reading code composed of a plurality of numbers and a plurality of symbols printed with magnetic ink; defining a first feature area, a second feature area, a third feature area, a fourth feature area, a fifth feature area and a sixth feature area; loading the first feature area, the second feature area, the third feature area, the fourth feature area, the fifth feature area and the sixth feature area based on one of the numbers, if no amount of magnetic ink in the first feature area, then interpreting the number as 0; conversely, dividing the number into a first block, a second block, a third block and a fourth block, and interpreting a magnetic ink density in the blocks respectively; if the magnetic ink density of the second block being greater than the magnetic ink density of the first block, and the magnetic ink density of the third block being greater than the magnetic ink density of the fourth block, then interpreting the number as 2; conversely, if no amount of magnetic ink in the fourth feature area and the fifth feature area, then interpreting the number as 5; if the number being not interpreted, interpreting the number as one of the numbers in a first group of numbers consisting of numbers 3 and 7 and 9 or as one of the numbers in a second group of numbers consisting of numbers 1 and 4 and 6 and 8 by comparing the magnetic ink density of the third block with the magnetic ink density of the second block; then performing number interpretation of the first group of numbers; if the magnetic ink density of the fourth block being greater than the magnetic ink density of the third block and no amount of magnetic ink in the third feature area and the fourth feature area, then interpreting the number as 3; if the magnetic ink density of the third block being greater than the magnetic ink density of the fourth block, and the magnetic ink density of the first block being greater than the magnetic ink density of the second block, then interpreting the number as 7, conversely, then interpreting the number as 9; further performing number interpretation of the second group of numbers; firstly, interpreting whether the magnetic ink density of the fourth block and the magnetic ink density of the second block being respectively greater than the magnetic ink density of the third block and the magnetic ink density of the first block; if so, interpreting whether an amount of magnetic ink being in the second feature area, if so, interpreting the number as 1; if no amount of magnetic ink in the second feature area, then interpreting whether the magnetic ink density of the first block being greater than the magnetic ink density of the third block and whether an amount of magnetic ink being in the sixth feature area, if so, then interpreting the number as 6, if one of the interpretations being negative, then interpreting the number as 8; and if both of the interpretations being negative, and interpreting no amount of magnetic ink in the fifth feature area and an amount of magnetic ink in the fourth feature area, then interpreting the number as 4.

The invention further discloses an E13B image interpretation method, and the interpretation method at least comprises steps of: generating a first target pixel, a second target pixel and a third target pixel for a first individual, a second individual and a third individual respectively, and interpreting a length, a width and a position of the first target pixel, the second target pixel and the third target pixel respectively; if the lengths of the first target pixel and the second target pixel being greater than the length of the third target pixel, and the width of the third target pixel being greater than the widths of the first target pixel and the second target pixel, then interpreting as a first symbol; if the length of the first target pixel being greater than the lengths of the second target pixel and the third target pixel, and the vertical axis position of the first target pixel being greater than the vertical axis position of the second target pixel or the vertical axis position of the first target pixel being greater than the vertical axis position of the third target pixel, then interpreting as a second symbol; if the vertical axis position of the third target pixel being smaller than the vertical axis position of the second target pixel, and the vertical axis position of the second target pixel being smaller than the vertical axis position of the first target pixel, then interpreting as a third symbol; and if the lengths and the widths of the first target pixel and the second target pixel being greater than the length and the width of the third target pixel, then interpreting as a fourth symbol.

BRIEF DESCRIPTION OF THE DRAWINGS

FIG. 7 is a flow chart of a symbol interpretation method of the E13B image interpretation method of the invention.

DETAILED DESCRIPTION OF THE INVENTION

Hereinafter, the detailed content and technical description of the present invention will be further described with reference to the embodiments, but it should be understood that these embodiments are only used for exemplification and illustration and should not be construed as a limitation of the implementation of the present invention.

Figure 1:
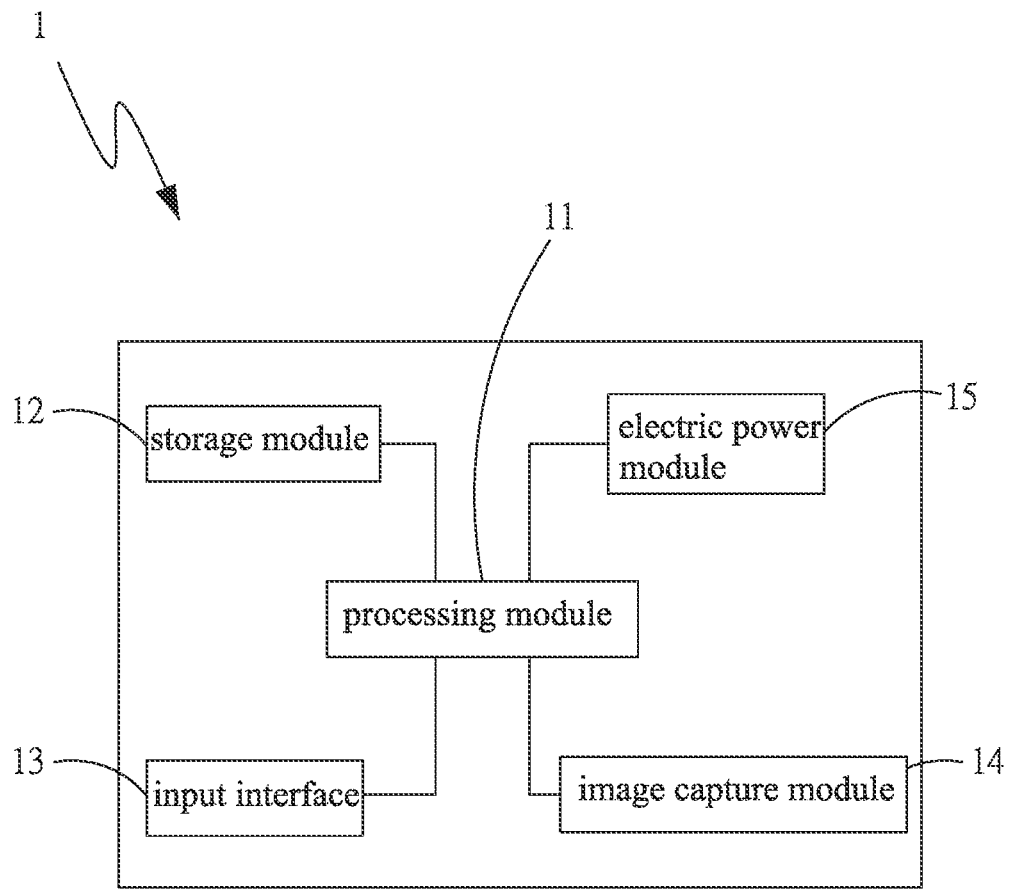
FIG. 1 is a schematic diagram of a hardware framework of an electronic device of the invention.

A main object of the invention is to interpret E13B images, and the invention can be applied to electronic devices with computing capabilities, such as desktop computer, notebook computer, mobile phone or tablet. An electronic device 1 of the invention comprises a processing module 11, a storage module 12, an input interface 13, an image capture module 14, and an electric power module 15. Please refer to FIG. 1 for a schematic diagram of a hardware framework of the electronic device of the invention.

Wherein the processing module 11 is electrically connected to the storage module 12, the input interface 13, the image capture module 14 and the electric power module 15, wherein the storage module 12 is used for storing digital images, the input interface 13 is used for controlling image capture and image capture operation, the image capture module 14 is used for photographing digital images, and the electric power module 15 is used to provide electric operating power for the processing module 11, the storage module 12, the input interface 13 and the image capture module 14.

Figure 2A:
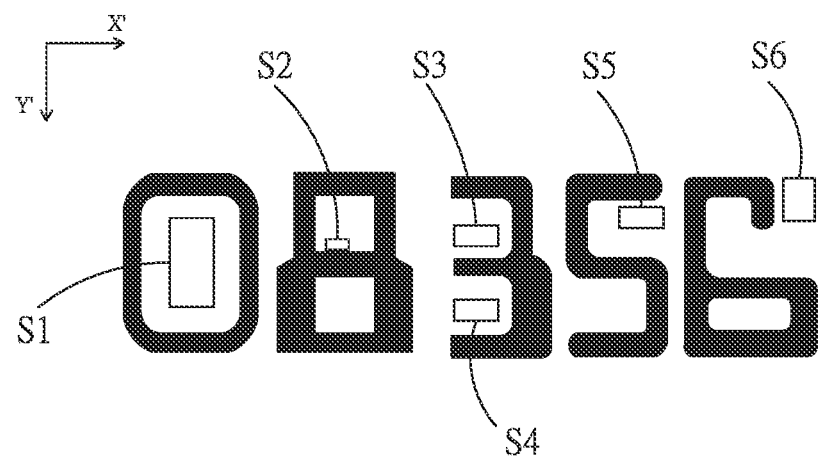
FIG. 2A is a schematic diagram of feature areas of an E13B image interpretation method of the invention.
Figure 2B:
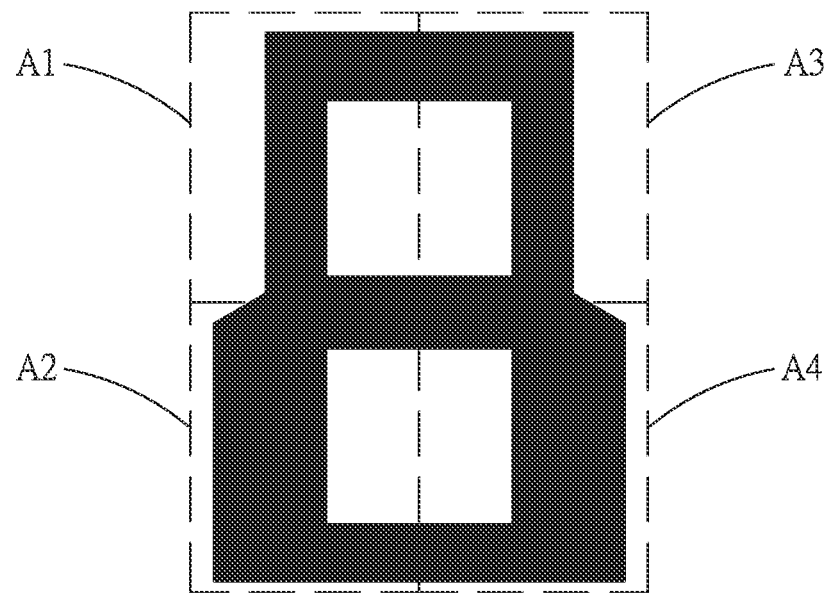
FIG. 2B is a schematic diagram of blocks of the E13B image interpretation method of the invention.

Then, please refer to FIG. 2A and FIG. 2B at the same time for schematic diagrams of feature areas and blocks of an E13B image interpretation method of the invention respectively, wherein the E13B image interpretation method mainly aims at interpreting numbers and symbols in a check reading code printed with magnetic ink on a check such as a check or a check of exchange, and the numbers comprise 10 numbers of 0-9. The processing module 11 of the electronic device 1 defines a first feature area S1, a second feature area S2, a third feature area S3, a fourth feature area S4, a fifth feature area S5 and a sixth feature area S6 for each of the numbers, and the processing module 11 has built-in horizontal axis (X) coordinates and vertical axis (Y) coordinates, a starting point of the coordinates is from the upper left, the horizontal axis (X) coordinates increase from left to right, and the vertical axis (Y) coordinates increase from top to bottom. A defining mode of the first feature area S1, the second feature area S2, the third feature area S3, the fourth feature area S4, the fifth feature area S5 and the sixth feature area S6 is that after the image capture module 14 captures an image of a certain number, the image is transmitted to the processing module 11, the processing module 11 will calculate a width (W) and a height (H) in a unit of pixel of a number area of each of the numbers, and calculate a rectangular range of each of the feature areas from the width (W) and height (H) of the number area and mark the rectangular range with a rectangular coordinate (X', Y', W', H'), X' and Y' are coordinates of leftmost and highest starting points of the rectangle respectively, wherein W' is a width coordinate extending from X' to the right, wherein H' is a length coordinate extending downward from Y', and the processing module 11 uses the rectangular coordinates to calculate the feature areas, and a calculation formula of each of the feature areas is:

| | |
|---|---|
| $W/3, H/4, W-((W/3)*2), W-(H/4)*2;$ | the first feature area S1: |
| $(W/5)*2, H/3, W/5, H/12;$ | the second feature area S2: |
| $0, (W/4), W/2, H/7;$ | the third feature area S3: |
| $0, (H/6)*4, W/2, H/7;$ | the fourth feature area S4: |
| $W/2, (H/6), W/2, H/6;$ and | the fifth feature area S5: |
| $W-(W/4), 0, W/4, H/4.$ | the sixth feature area S6: |

Thereby, the processing module 11 calculates the feature areas of each of the numbers using the above calculation formulas, and the numbers 0, 8, 3, 5, 6 are used to show each of the feature areas in the figure respectively. In addition, the processing module 11 further divides each of the numbers into a first block A1, a second block A2, a third block A3 and a fourth block A4 by dividing a total area of the number area of each of the numbers by ¼, wherein the first block A1 is an upper left area of the number, the second block A2 is a lower left area of the number, the third block A3 is an upper right area of the number, the fourth block A4 is a lower right area of the number, and the blocks are shown by the single number 8 in the figure.

Figure 3:
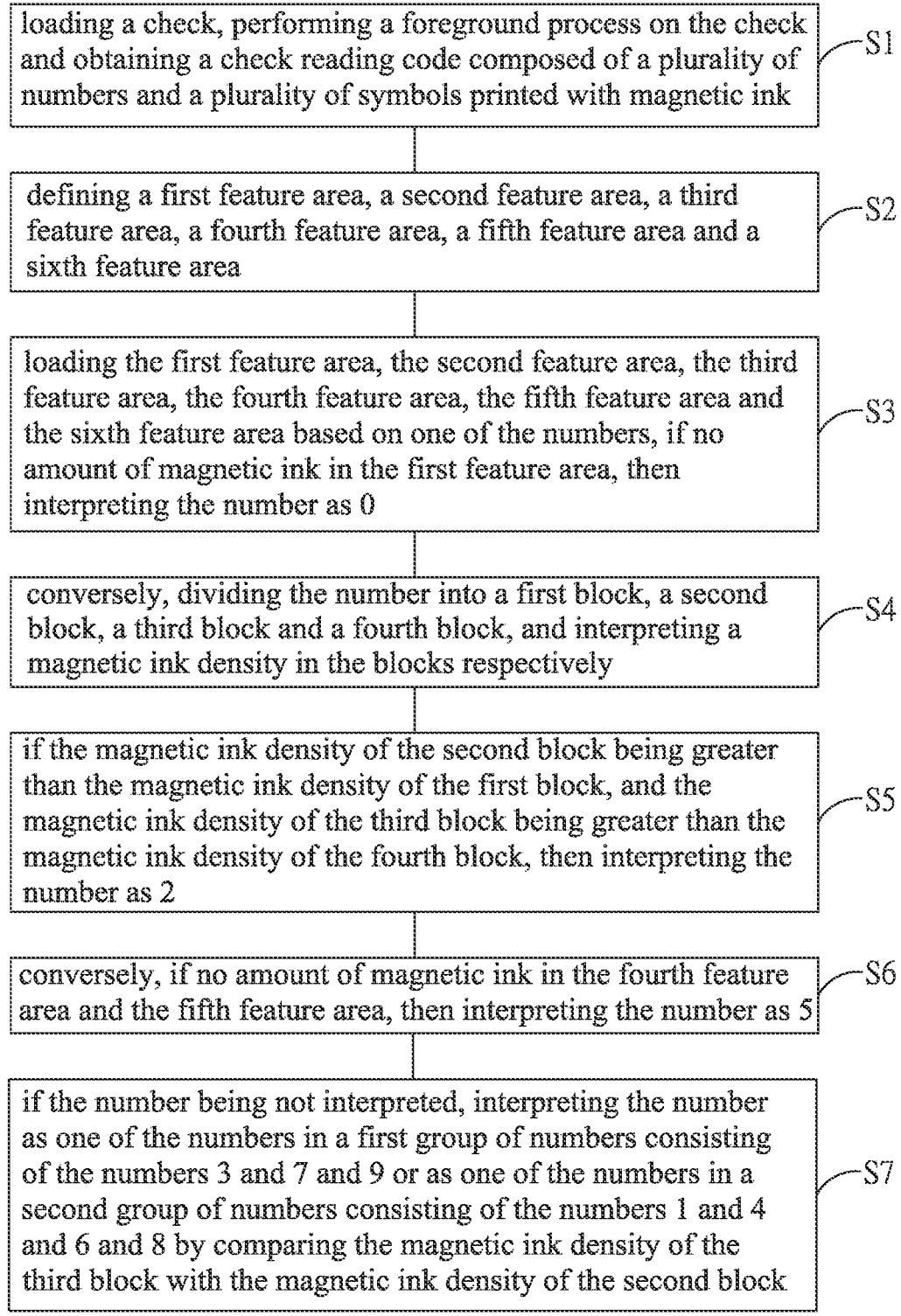
FIG. 3 is a first flow chart of a number interpretation method of the E13B image interpretation method of the invention.

Then, please refer to FIG. 3 at the same time for a first flow chart of a number interpretation method of the E13B image interpretation method of the invention, and in this embodiment, it is the number interpretation method of the check reading code:

step S1: loading a check, performing a foreground process on the check and obtaining the check reading code composed of a plurality of numbers and a plurality of symbols printed with magnetic ink; wherein the check to be interpreted is provided, and perform a pre-process step on the check using the processing module 11 to separate a non-text area background from a text area foreground on the check, so that the processing module 11 is capable of obtaining the check reading code, the check reading code comprises the numbers and the symbols;

step S2: defining a first feature area, a second feature area, a third feature area, a fourth feature area, a fifth feature area and a sixth feature area; wherein the processing module 11 defines a first feature area S1, a second feature area S2, a third feature area S3, a fourth feature area S4, a fifth feature area S5 and a sixth feature area S6, it can be clearly seen from the figure that each of the feature areas is an area frame with a different position and a different size;

step S3: loading the first feature area, the second feature area, the third feature area, the fourth feature area, the fifth feature area and the sixth feature area based on one of the numbers, if no amount of magnetic ink in the first feature area, then interpreting the number as 0; when the processing module 11 interprets the number, the processing module 11 sequentially loads the first feature area S1, the second feature area S2, the third feature area S3, the fourth feature area S4, the fifth feature area S5 and the sixth feature area S6, loading sequentially is based on when the previous feature area cannot be interpreted, determination will be made according to each of the loaded feature areas, wherein the first feature area S1 is loaded first, if the processing module 11 determines that there is no amount of magnetic ink in the first feature area S1, then the number is interpreted as 0;

step S4: conversely, dividing the number into a first block, a second block, a third block and a fourth block, and interpreting a magnetic ink density in the blocks respectively; wherein if there is magnetic ink distributed in the first feature area S1, the processing module 11 interprets that the number is not 0, and divides the number into the first block A1, the second block A2, the third block A3 and the fourth block A4, and the processing module 11 interprets the magnetic ink density of each of the blocks;

step S5: if the magnetic ink density of the second block being greater than the magnetic ink density of the first block, and the magnetic ink density of the third block being greater than the magnetic ink density of the fourth block, then interpreting the number as 2; wherein after the number is divided into the first block A1, the second block A2, the third block A3 and the fourth block A4, the processing module 11 reads the magnetic ink density in the first block A1, the second block A2, the third block A3 and the fourth block A4 respectively, if the magnetic ink density of the second block A2 is greater than the magnetic ink density of the first block A1, and the magnetic ink density of the third block A3 is greater than the magnetic ink density of the fourth block A4, the processing module 11 interprets the number as 2;

step S6: conversely, if no amount of magnetic ink in the fourth feature area and the fifth feature area, then interpreting the number as 5; but if the magnetic ink density of the second block A2 is not greater than the magnetic ink density of the first block A1, and the magnetic ink density of the third block A3 is not greater than the magnetic ink density of the fourth block A4, the processing module 11 determines whether there is an amount of magnetic ink in the fourth feature area S4 and the fifth feature area S5, if there is no amount of magnetic ink in the fourth feature area S4 and the fifth feature area S5, the processing module 11 interprets the number as 5; and step S7: if the number being not interpreted, interpreting the number as one of the numbers in a first group of numbers consisting of the numbers 3 and 7 and 9 or as one of the numbers in a second group of numbers consisting of the numbers 1 and 4 and 6 and 8 by comparing the magnetic ink density of the third block with the magnetic ink density of the second block; wherein in the aforementioned procedures, if the processing module 11 cannot determine the number from the blocks and the feature areas, the processing module 11 compares the magnetic ink density of the third block A3 with the magnetic ink density of the second block A2, wherein if the magnetic ink density of the third block A3 is greater than the magnetic ink density of the second block A2, the number is interpreted as one of the numbers in the first group of numbers consisting of the numbers 3 and 7 and 9, conversely, if the magnetic ink density of the third block A3 is not greater than the magnetic ink density of the second block A2, the number is interpreted as one of the numbers in the second group of numbers consisting of the numbers 1 and 4 and 6 and 8, after comparison, the number is grouped under the first group of numbers consisting of the numbers 3 and 7 and 9 or grouped under the second group of numbers consisting of the numbers 1 and 4 and 6 and 8.

Figure 4:
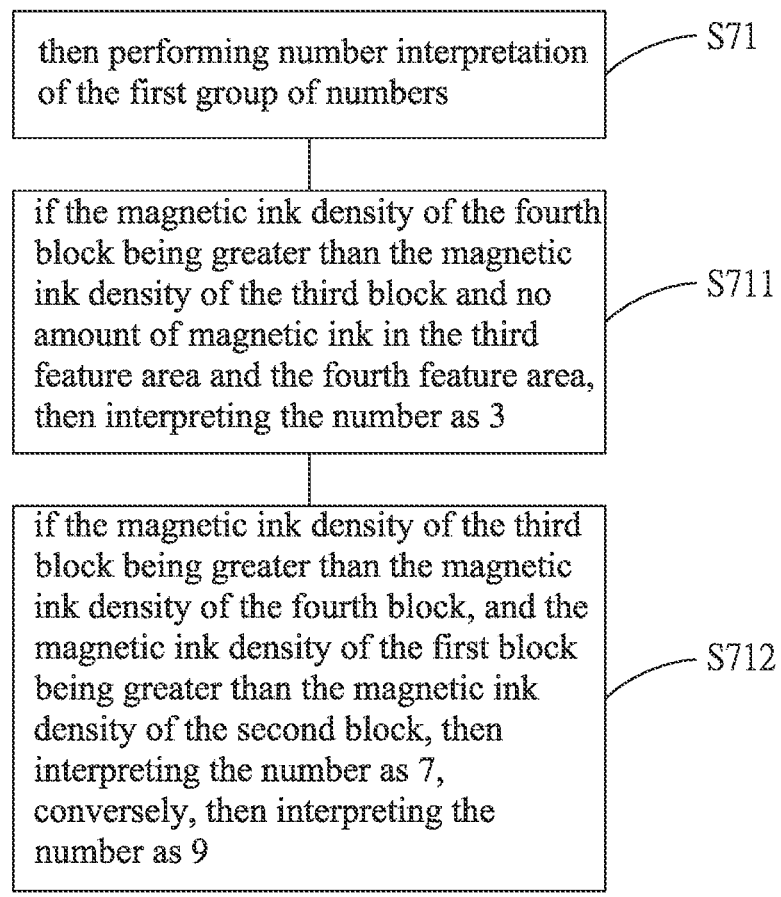
FIG. 4 is a second flow chart of the number interpretation method of the E13B image interpretation method of the invention.

Then, please refer to FIG. 4 at the same time for a second flow chart of the number interpretation method of the E13B image interpretation method of the invention, and in this embodiment, it is the number interpretation method of the first group of numbers:

step S71: then performing number interpretation of the first group of numbers; wherein if the processing module 11 cannot determine the number from the blocks and the feature areas, the processing module 11 compares the magnetic ink density of the third block A3 with the magnetic ink density of the second block A2, after comparison, the number is grouped under the first group of numbers consisting of the numbers 3 and 7 and 9, and the numbers of the first group of numbers are first interpreted;

step S711: if the magnetic ink density of the fourth block being greater than the magnetic ink density of the third block and no amount of magnetic ink in the third feature area and the fourth feature area, then interpreting the number as 3; wherein if the processing module 11 determines that the magnetic ink density of the fourth block A4 is greater than the magnetic ink density of the third block A3 and there is no amount of magnetic ink in the third feature area S3 and the fourth feature area S4, then the processing module 11 interprets the number as 3; and step S712: if the magnetic ink density of the third block being greater than the magnetic ink density of the fourth block, and the magnetic ink density of the first block being greater than the magnetic ink density of the second block, then interpreting the number as 7, conversely, then interpreting the number as 9; wherein if the processing module 11 determines that the magnetic ink density of the fourth block A4 is not greater than the magnetic ink density of the third block A3 or there is an amount of magnetic ink in the third feature area S3 and the fourth feature area S4, then the processing module 11 determines whether the magnetic ink density of the third block A3 is greater than the magnetic ink density of the fourth block A4 and whether the magnetic ink density of the first block A1 is greater than the magnetic ink density of the second block A2, if the magnetic ink density of the third block A3 is greater than the magnetic ink density of the fourth block A4, and the magnetic ink density of the first block A1 is greater than the magnetic ink density of the second block A2, the number is interpreted as 7; conversely, the number is interpreted as 9.

Figure 5:
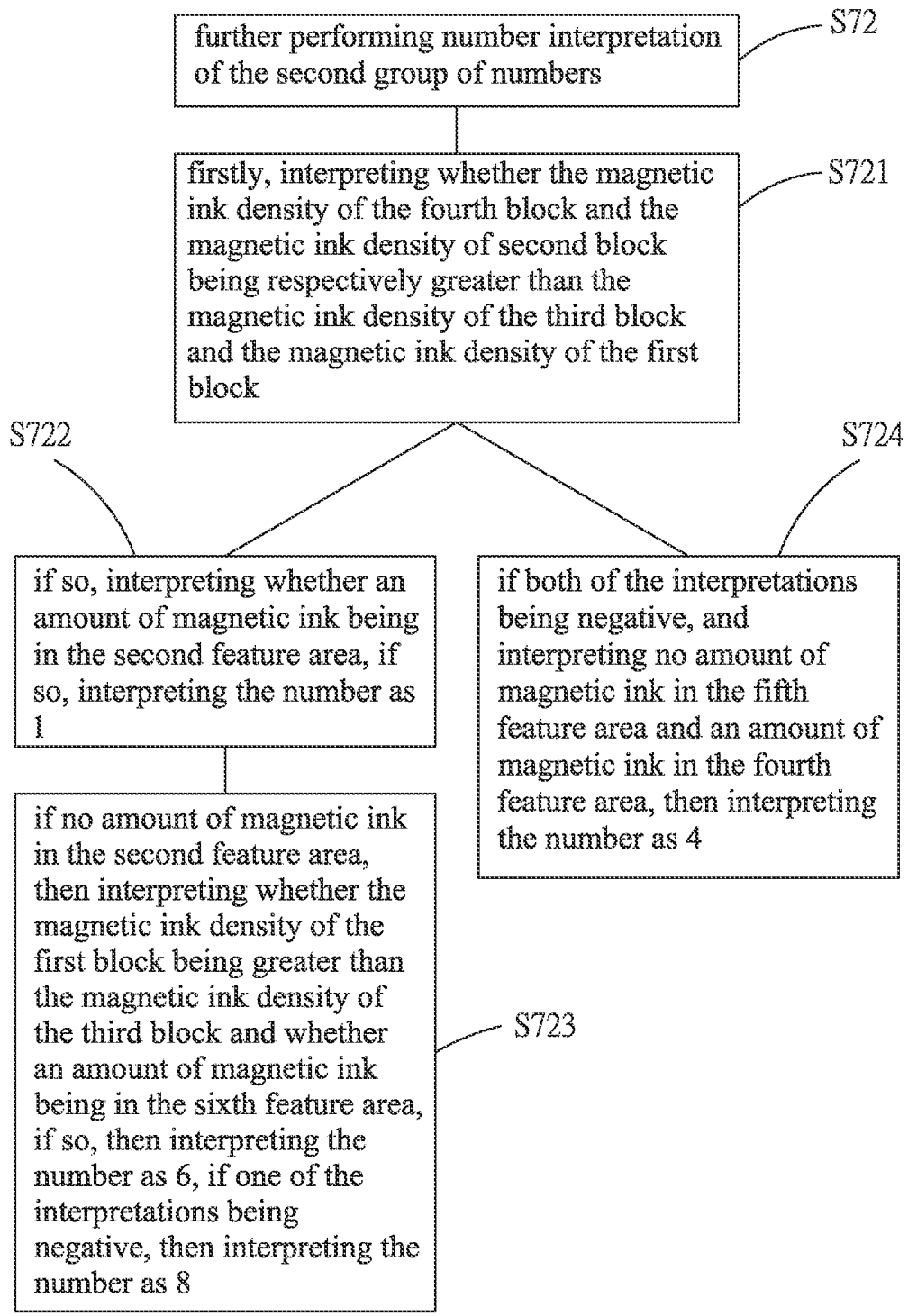
FIG. 5 is a third flow chart of the number interpretation method of the E13B image interpretation method of the invention.

Then, please refer to FIG. 5 at the same time for a third flow chart of the number interpretation method of the E13B image interpretation method of the invention, and in this embodiment, it is the number interpretation method of the second group of numbers:

step S72: further performing number interpretation of the second group of numbers; wherein if the processing module 11 cannot determine the number from the blocks and the feature areas, the processing module 11 compares the magnetic ink density of the third block A3 with the magnetic ink density of the second block A2, after comparison, the number is grouped under the first group of numbers consisting of the numbers 3 and 7 and 9, the numbers of the first group of numbers are first interpreted, and then number interpretation of the second group of numbers is performed;

step S721: firstly, interpreting whether the magnetic ink density of the fourth block and the magnetic ink density of second block being respectively greater than the magnetic ink density of the third block and the magnetic ink density of the first block; wherein the processing module 11 first interprets whether the magnetic ink density of the fourth block A4 and the magnetic ink density of the second block A2 are respectively greater than the magnetic ink density of the third block A3 and the magnetic ink density of the first block A1;

step S722: if so, interpreting whether an amount of magnetic ink being in the second feature area, if so, interpreting the number as 1; wherein if the processing module 11 determines that the magnetic ink density of the fourth block A4 and the magnetic ink density of the second block A2 are respectively greater than the magnetic ink density of the third block A3 and the magnetic ink density of the first block A1, the processing module 11 interprets whether there is an amount of magnetic ink in the second feature area S2, if there is an amount of magnetic ink in the second feature area S2, the processing module 11 determines the number as 1;

step S723: if no amount of magnetic ink in the second feature area, then interpreting whether the magnetic ink density of the first block being greater than the magnetic ink density of the third block and whether an amount of magnetic ink being in the sixth feature area, if so, then interpreting the number as 6, if one of the interpretations being negative, then interpreting the number as 8; but if there is no amount of magnetic ink in the second feature area S2, the processing module 11 then interprets whether the magnetic ink density of the first area A1 is greater than the magnetic ink density of the third block A3 and whether there is an amount of magnetic ink in the sixth feature area S6, if both conditions are met, then the processing module 11 determines the number as 6, if one or both of the conditions are not met, then the processing module 11 determines the number as 8; and step S724: if both of the interpretations being negative, and interpreting no amount of magnetic ink in the fifth feature area and an amount of magnetic ink in the fourth feature area, then interpreting the number as 4; wherein if the processing module 11 determines the magnetic ink density of the fourth block A4 and the magnetic ink density of the second block A2 are not greater than the magnetic ink density of the third block A3 and the magnetic ink density of the first block A1, respectively, the processing module 11 then interprets whether there is an amount of magnetic ink in the fifth feature area S5 and whether there is an amount of magnetic ink in the fourth feature area S4, if interpreting there is no amount of magnetic ink in the fifth feature area S5 and there is an amount of magnetic ink in the fourth feature area S4, then the processing module 11 determines the number as 4, but if the conditions of no amount of magnetic ink in the fifth feature area S5 and an amount of magnetic ink in the fourth feature area S4 are not met, it means that the number is not a number of an E13B font.

Figure 6:
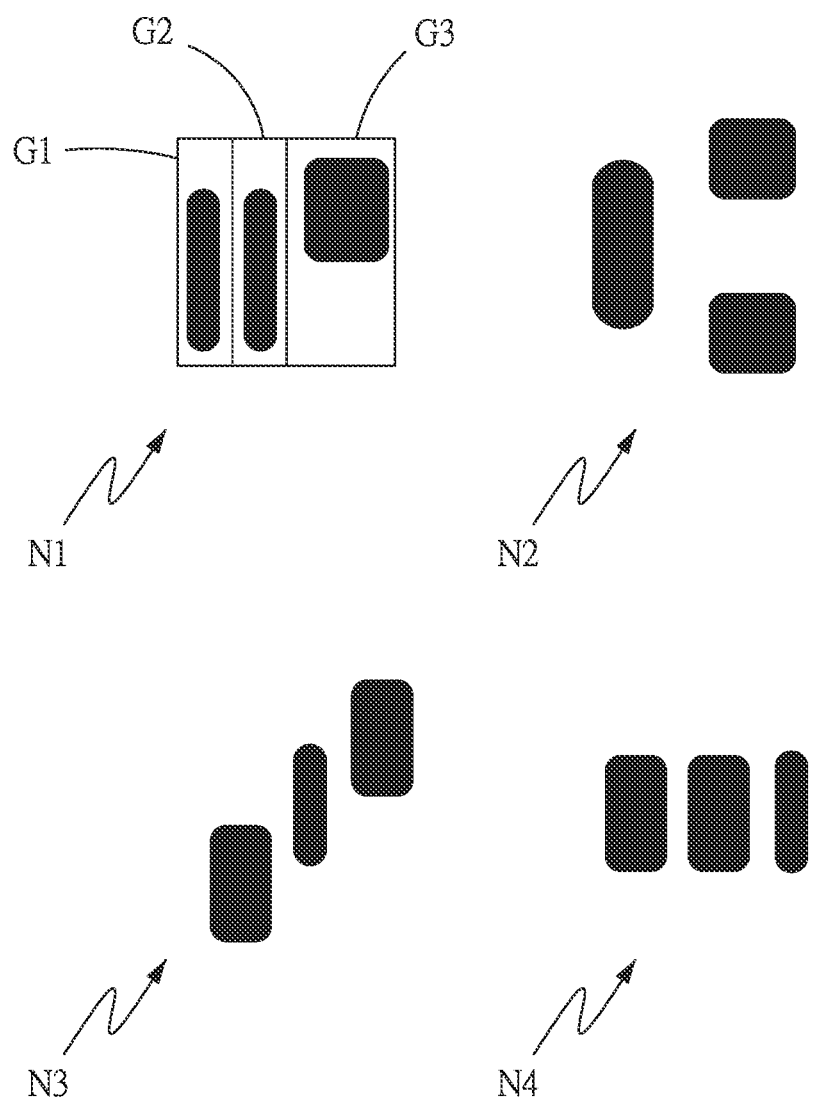
FIG. 6 is a schematic diagram of target pixels of the E13B image interpretation method of the invention.

Please refer to the aforementioned figures and FIG. 6 for a schematic diagram of target pixels of the E13B image interpretation method of the invention, wherein the E13B image interpretation method mainly aims at interpreting numbers and symbols in the check reading code printed with magnetic ink on a check such as a check or a check of exchange, the symbol comprises a first symbol N1, a second symbol N2, a third symbol N3 and a fourth symbol N4, each of the symbols comprises a first individual, a second individual and a third individual. The processing module 11 generates a first target pixels G1, a second target pixel G2 and a third target pixel G3 from left to right and from top to bottom for the first individual, the second individual and the third individual of each of the symbols respectively, and the target pixels are shown by the first symbol N1 in the figure.

Then, please refer to FIG. 7 at the same time for a flow chart of a symbol interpretation method of the E13B image interpretation method of the invention, and in this embodiment, it is the symbol interpretation method of the check reading code:

step S81: generating a first target pixel, a second target pixel and a third target pixel for a first individual, a second individual and a third individual respectively, and interpreting a length, a width and a position of the first target pixel, the second target pixel and the third target pixel respectively; wherein the processing module 11 generates the first target pixels G1, the second target pixel G2 and the third target pixel G3 for the first individual, the second individual and the third individual respectively, wherein the first target pixel G1 and the second target pixel G2 are respectively put into the first individual and the second individual, but because there may be stains adhered on the check, the processing module 11 will treat the stain as an individual, if the stain is determined as the first individual by the processing module 11, the processing module 11 will place the first target pixel G1 on the first individual of the stain, so the processing module 11 will first determine a distance between the first individual of the stain and the second individual, and the determination condition is that a distance between the first individual and the second individual needs to be greater than 2 and less than 10 before entering subsequent steps, but if it is determined that a distance between the first individual of the stain and the second individual is outside the range of greater than 2 and less than 10, the processing module 11 will remove the first individual of the stain, change the second target pixel G2 to the first target pixel G1, and sequentially capture the other second target pixel G2 until a distance between the first individual and the second individual is greater than 2 and less than 10, then determination of placing the first target pixel G1 into the first individual is completed, and then the second target pixel G2 can be placed in the second individual, and the third target pixel G3 can be placed in the third individual sequentially, and then a length, a width and a position between the first target pixel G1, the second target pixel G2 and the third target pixel G3 of the first individual, the second individual and the third individual respectively can be interpreted;

step S82: if the lengths of the first target pixel and the second target pixel being greater than the length of the third target pixel, and the width of the third target pixel being greater than the widths of the first target pixel and the second target pixel, then interpreting as the first symbol; wherein if the processing module 11 determines that the lengths of the first target pixel G1 and the second target pixel G2 are greater than the length of the third target pixel G3, and the width of the third target pixel G3 is greater than the widths of the first target pixel G1 and the second target pixel G2, then the processing module 11 interprets the symbol as the first symbol N1;

step S83: if the length of the first target pixel being greater than the lengths of the second target pixel and the third target pixel, and the vertical axis position of the first target pixel being greater than the vertical axis position of the second target pixel or the vertical axis position of the first target pixel being greater than the vertical axis position of the third target pixel, then interpreting as the second symbol; wherein if the processing module 11 determines that the length of the first target pixel G1 is greater than the lengths of the second target pixel G2 and the third target pixel G3, and determines that the vertical axis position of the first target pixel G1 is greater than the vertical axis position of the second target pixel G2 or the vertical axis position of the first target pixel G1 is greater than the vertical axis position of the third target pixel G3, then the processing module 11 interprets the symbol as the second symbol N2, wherein because when the symbol is printed with magnetic ink, the printing may be skewed, so relative positions of the second individual and the third individual of the second symbol N2 may be changed due to skew, for example, when the second symbol N2 is printed normally, the processing module 11 generates the first target pixel G1, the second target pixel G2 and the third target pixel G3 from left to right and from top to bottom for the first individual, the second individual and the third individual of each of the symbols respectively, but if the second symbol N2 is skewed, a position of the third individual may be located to the left of the second individual, causing the processing module 11 to determine the third individual as the second individual, and determine the second individual as the third individual, so the determination condition of the second symbol N2 further comprises that the vertical axis position of the first target pixel G1 is greater than the vertical axis position of the second target pixel G2 or the vertical axis position of the first target pixel G1 is greater than the vertical axis position of the third target pixel G3, so as to avoid a situation that the processing module 11 cannot determine or determines wrongly due to the skewed condition;

step S84: if the vertical axis position of the third target pixel being smaller than the vertical axis position of the second target pixel, and the vertical axis position of the second target pixel being smaller than the vertical axis position of the first target pixel, then interpreting as the third symbol; wherein if the processing module 11 determines that the vertical axis position of the third target pixel G3 is smaller than the vertical axis position of the second target pixel G2, and the vertical axis position of the second target pixel G2 is smaller than the vertical axis position of the first target pixel G1, then the processing module 11 interprets the symbol as the third symbol N3; and step S85: if the lengths and the widths of the first target pixel and the second target pixel being greater than the length and the width of the third target pixel, then interpreting as a fourth symbol; wherein if the processing module 11 determines that the lengths and the widths of the first target pixel G1 and the second target pixel G2 are greater than the length and the width of the third target pixel G3, then the processing module 11 interprets the symbol as the fourth symbol N4.

Thereby the E13B image interpretation method is capable of accurately determining the numbers and the symbols of the check reading code of the check through the interpreting steps and the interpreting conditions to achieve efficacies of reducing the cost of interpreting equipment and eliminating the time-consuming process of manual interpretation, and to achieve an efficacy of accurate interpretation.

It is to be understood that the above description is only preferred embodiments of the invention and is not used to limit the invention, and changes in accordance with the concepts of the invention may be made without departing from the spirit of the invention, for example, the equivalent effects produced by various transformations, variations, modifications and applications made to the configurations or arrangements shall still fall within the scope covered by the appended claims of the invention.

What is claimed is:

1. An E13B image interpretation method at least comprising steps of:
loading a check, performing a foreground process on the check and obtaining a check reading code composed of a plurality of numbers and a plurality of symbols printed with magnetic ink;
defining a first feature area, a second feature area, a third feature area, a fourth feature area, a fifth feature area and a sixth feature area;
loading the first feature area, the second feature area, the third feature area, the fourth feature area, the fifth feature area and the sixth feature area based on one of the numbers, if no amount of magnetic ink in the first feature area, then interpreting the number as 0;
conversely, dividing the number into a first block, a second block, a third block and a fourth block, and interpreting a magnetic ink density in the blocks respectively;
if the magnetic ink density of the second block being greater than the magnetic ink density of the first block, and the magnetic ink density of the third block being greater than the magnetic ink density of the fourth block, then interpreting the number as 2;
conversely, if no amount of magnetic ink in the fourth feature area and the fifth feature area, then interpreting the number as 5;
if the number being not interpreted, interpreting the number as one of the numbers in a first group of numbers consisting of numbers 3 and 7 and 9 or as one of the numbers in a second group of numbers consisting of numbers 1 and 4 and 6 and 8 by comparing the magnetic ink density of the third block with the magnetic ink density of the second block;
then performing number interpretation of the first group of numbers;
if the magnetic ink density of the fourth block being greater than the magnetic ink density of the third block and no amount of magnetic ink in the third feature area and the fourth feature area, then interpreting the number as 3;
if the magnetic ink density of the third block being greater than the magnetic ink density of the fourth block, and the magnetic ink density of the first block being greater than the magnetic ink density of the second block, then interpreting the number as 7, conversely, then interpreting the number as 9;
further performing number interpretation of the second group of numbers;
firstly, interpreting whether the magnetic ink density of the fourth block and the magnetic ink density of the second block being respectively greater than the magnetic ink density of the third block and the magnetic ink density of the first block;
if so, interpreting whether an amount of magnetic ink being in the second feature area, if so, interpreting the number as 1;
if no amount of magnetic ink in the second feature area, then interpreting whether the magnetic ink density of the first block being greater than the magnetic ink density of the third block and whether an amount of magnetic ink being in the sixth feature area, if so, then interpreting the number as 6, if one of the interpretations being negative, then interpreting the number as 8; and if both of the interpretations being negative, and interpreting no amount of magnetic ink in the fifth feature area and an amount of magnetic ink in the fourth feature area, then interpreting the number as 4.

2. The E13B image interpretation method as claimed in claim 1, wherein the first block is an upper left area of the number, the second block is a lower left area of the number, the third block is an upper right area of the number, and the fourth block is a lower right area of the number.

3. The E13B image interpretation method as claimed in claim 1, wherein if the magnetic ink density of the third block is greater than the magnetic ink density of the second block, the number is interpreted as one of the numbers in the first group of numbers consisting of the numbers 3 and 7 and 9, conversely, if the magnetic ink density of the third block is not greater than the magnetic ink density of the second block, the number is interpreted as one of the numbers in the second group of numbers consisting of the numbers 1 and 4 and 6 and 8.

4. The E13B image interpretation method as claimed in claim 1, wherein the steps are a number interpretation method of the check reading code.

5. The E13B image interpretation method as claimed in claim 4, being applied to an electronic device, the electronic device comprising a processing module, a storage unit, an input interface, an image capture module and an electric power module, the image capture module capturing an image of a check and the processing module performing a foreground process to obtain the check reading code.

6. The E13B image interpretation method as claimed in claim 5, wherein the processing module defines the first feature area, the second feature area, the third feature area, the fourth feature area, the fifth feature area and the sixth feature area, and divides the number into the first block, the second block, the third block and the fourth block.

7. The E13B image interpretation method as claimed in claim 5, wherein the check reading code comprises a first symbol, a second symbol, a third symbol and a fourth symbol, and each of the symbols comprises a first individual, a second individual and a third individual respectively, and the interpretation method at least comprises steps of:

generating a first target pixel, a second target pixel and a third target pixel for the first individual, the second individual and the third individual respectively, and interpreting a length, a width and a position of the first target pixel, the second target pixel and the third target pixel respectively;

if the lengths of the first target pixel and the second target pixel being greater than the length of the third target pixel, and the width of the third target pixel being greater than the widths of the first target pixel and the second target pixel, then interpreting as the first symbol;

if the length of the first target pixel being greater than the lengths of the second target pixel and the third target pixel, and the vertical axis position of the first target pixel being greater than the vertical axis position of the second target pixel or the vertical axis position of the first target pixel being greater than the vertical axis position of the third target pixel, then interpreting as the second symbol;

if the vertical axis position of the third target pixel being smaller than the vertical axis position of the second target pixel, and the vertical axis position of the second target pixel being smaller than the vertical axis position of the first target pixel, then interpreting as the third symbol; and if the lengths and the widths of the first target pixel and the second target pixel being greater than the length and the width of the third target pixel, then interpreting as the fourth symbol.

8. The E13B image interpretation method as claimed in claim 7, wherein the processing module defines the first target pixel, the second target pixel and the third target pixel.

9. The E13B image interpretation method as claimed in claim 7, wherein interpretation of a length, a width and a position of the first individual, the second individual and the third individual with the first target pixel, the second target pixel and the third target pixel is a symbol interpretation method of the check reading code.

* * * * *